Sept. 18, 1923.                    1,468,393
J. L. PERKINS ET AL
RACK BROACHING MACHINE
Filed July 22, 1921        4 Sheets-Sheet 3

Sept. 18, 1923.

J. L. PERKINS ET AL 1,468,393

RACK BROACHING MACHINE

Filed July 22, 1921        4 Sheets-Sheet 4

Julian L. Perkins,
Hiram M. Croft, INVENTORS,

BY

Frank A. Cutter, ATTORNEY.

Patented Sept. 18, 1923.

1,468,393

UNITED STATES PATENT OFFICE.

JULIAN L. PERKINS, OF WEST SPRINGFIELD, AND HIRAM D. CROFT, OF SPRINGFIELD, MASSACHUSETTS, ASSIGNORS TO PERKINS APPLIANCE COMPANY, OF SPRINGFIELD, MASSACHUSETTS, A CORPORATION OF MASSACHUSETTS.

RACK-BROACHING MACHINE.

Application filed July 22, 1921. Serial No. 486,881.

*To all whom it may concern:*

Be it known that we, JULIAN L. PERKINS, and HIRAM D. CROFT, both citizens of the United States of America, said PERKINS being a resident of West Springfield, in the county of Hampden and State of Massachusetts, and said CROFT being a resident of Springfield, in said county and State, have invented a new and useful Rack-Broaching Machine, of which the following is a specification.

Our invention relates to improvements in machines for broaching racks, and resides broadly and generally in a continuously traveling cutting element, which is caused to pass through a straight course that is a part of the complete, circuitous path of travel of said broach, mechanism for reciprocating said element in the plane of its path, and means for intermittently actuating the work, together with such subsidiary and auxiliary mechanism or mechanisms and parts and members as may be necessary or desirable in order to render the machine complete and serviceable in every respect, all as hereinafter set forth.

This invention is presented here in form of an attachment for a machine for broaching gears, of which machine Frank W. Sickles and ourselves are joint inventors, and the same is included in a pending application for Letters Patent of the United States.

While it is possible to employ in this machine a cutting element having a single row of cutting parts or teeth, it is preferred to provide said element with a plurality of rows of such parts or teeth. These teeth cut across or into the field in which the work is located, and the cutting element is advanced until the work teeth are cut to depth, when said element is retracted, the work actuated to present the next succeeding portion thereof to said first named teeth, and said element is advanced again, these operations being repeated until the required number of teeth have been cut in the work.

The shape and size of the cutting-element teeth necessarily correspond to the shape and size of the slots cut in the work to form the teeth thereon.

The primary object of our invention is to produce a machine for cutting or broaching racks, or other objects of a more or less similar character, in an expeditious, accurate, and economical manner, so that the output of such machine is large as compared with that of machines for cutting racks in the old way. We are able to do this because with our machine a greater amount of material is removed from the work in a given time, due to the fact that the cutting element operates on the total width of the work in every case, and to the further fact that said element can be driven at a speed which, even though commensurate with the amount of material removed, coupled with the other features that tend to accomplish or assist in accomplishing the same end, is great enough to enable the machine to produce the results noted above. Thus the cutting element removes a greater amount of material in a given time than other types of rack cutters, and is, therefore, a very important factor in the increased production of the machine.

Another object of our invention is to provide a machine of this character with which a very great number of different kinds and sizes of racks and other work can be cut, even in the event it be required that the serrations are cut in the work are at some other than a right-angle to the longitudinal plane of said work. This latter advantage is due to the presence of the universal head, for the cutting element with which the machine is provided.

A further object is to provide the machine with adequate and convenient means of adjustment and control, so that the same can readily be set for different kinds of work, and the operation of the machine is efficient in every particular, and always subject to the will of the operator.

Other objects and advantages will appear in the course of the following description.

A preferred form or embodiment of the invention, whereby we attain the objects and secure the advantages of the same, is illustrated in the accompanying drawings, and we will proceed to describe the invention with reference to said drawings, although it is to be understood that the form, construction, arrangement, etc., of the parts, in various aspects, are immaterial and may be modified without departure from the spirit of the invention.

In the drawings, in which similar characters designate similar parts throughout the several views, Fig. 13, a detail in cross section, taken on lines 13—13, looking down in Fig. 18; Fig. 14, an enlarged detail, in front elevation and partial section, of a portion of the chain broach, the same being placed horizontally on the sheet, as are Figs. 15 and 16, although in practice said broach occupies a vertical or approximately vertical position, as illustrated in other views; Fig. 15, a side elevation of the parts shown in Fig. 14; Fig. 16, an enlarged, end elevation of one of the cutter-bars of said chain broach; Fig. 17, an enlarged detail of the lower portion of the chain broach and one of the actuating wheels therefor, to illustrate more fully the parts shown in Fig. 19; Fig. 18, an enlarged, front-end elevation, in partial section, of the universal head of the machine with the associated parts and members, including the chain broach, and, Fig. 19, an enlarged, longitudinal, vertical section through said head and parts and members shown in Fig. 18, the chain broach being in side elevation and the work carrying and actuating mechanism in end elevation.

Figs. 14, 15, and 16 are on a larger scale than the other enlarged views.

With the exception of the work carrying and actuating mechanism, the construction or arrangement of the broach teeth, and changes in some minor particulars, the machine herein shown and described is similar to that of which mention has been made as forming the subject matter of a pending application, wherefore it is not sought to claim the same in this application.

The frame of the machine, as illustrated in connection herewith, is indicated by the numeral 1. At the front end of the frame 1 are upper and under bearings 2 and 3, respectively, for a work shaft 4. A work table 6 is formed at the top of the bearing 2. Journaled in upper and under bearings 7 and 8, respectively, in the rear end of the frame, is a shaft 9. The frame is provided on top, intermediate of the end portions thereof, with a bed 10.

Mounted on the bed 10 to slide thereon lengthwise of the machine is a carriage 11, gibs 12 and bolts 113 being employed to hold said carriage in place on said bed. The carriage 11 has on the under side and extending longitudinally thereof, a nut 14 in which there is an internally screw-threaded bushing 15. A horizontal, operating screw 16 extends into the bushing 15 and engages the same for the purpose of actuating said bushing, and with it the nut 14 and the carriage 11, in one direction or the other, as said screw is rotated and according to the direction of such rotation. The screw 16 has at its rear terminal a shank 17 which is journaled in a bearing 18 in the frame 1. Mounted for rotary adjustment in the front end of the carriage 11 is a head 19, which has two forwardly-extending arms 20 for rotary members that carry a chain broach 21. A horizontal, main or driving shaft 22 is supported at the rear terminal by a bearing 23 on top of the frame, and journaled at the forward terminal in the head 19, said shaft constituting the axis upon which said head is adapted to be rotated. The carriage 11 has at the front a bearing-box 24 for the under portion of the head 19, which bearing-box is provided with a bearing-cap 25 for the upper portion of said head, bolts 26 being employed to secure said cap to said box, as usual. Spaces are left between adjacent parts of the bearing-box 24 and the bearing-cap 25. At the rear end of the carriage 6 is a bearing 27, which supplements the bearing 23 and the bearing afforded by the head 19, for the shaft 22. A pulley 28 is mounted on the shaft 22 in front of the bearing 27, and said pulley is driven by means of a belt 29. It is at this point that power is applied to drive the entire machine.

Secured to the shaft 22 immediately behind the head 19 is a gear 30. A collar 31 on the shaft 22, in front of the bearing 27, and the gear 30 hold said shaft against longitudinal movement in the carriage 11 and the head 19. A bevel-gear 31 has a sleeve 32 which is mounted on the shaft 22 and journaled in the bearing 23. The sleeve 32 is provided with a collar or flange 33 in front of the bearing 23, which, with the bevel-gear 31, hold said sleeve against longitudinal movement, while at the same time permitting the shaft 22 to be moved longitudinally—see Figs. 1 and 4. The sleeve 32 is keyed to the shaft 22, but the latter is free to move longitudinally in the former.
The bearing 23 has a cap 34 secured thereto by bolts 35. The longitudinal movement of the carriage 11 and with it the shaft 22 is comparatively slight, as will presently appear.
Journaled in a bearing 36, on the frame 1 forward of the bearing 23, is a shaft 37 which is at right-angles to but on a level with the shaft 22. Secured to opposite ends of the shaft 37 in front of and behind the bearing 36 are two bevel-gears 38. The rear bevel-gear 38 intermeshes with the bevel-gear 31.

Figure 1:
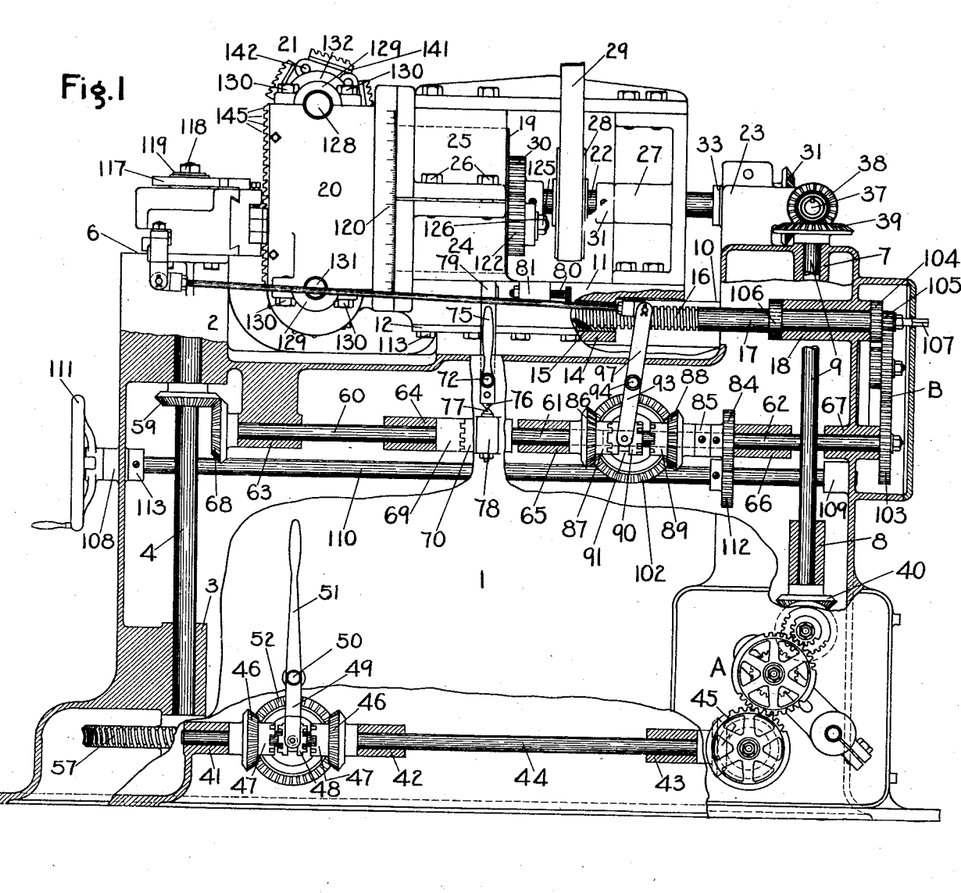
Figure 1 is a side elevation, with parts broken away, of a machine which embodies a practical form of our invention as aforesaid.

It should be noted in passing that the side of the machine illustrated in Fig. 1 is considered as the front side, and the left-hand end of said machine as therein illustrated is considered as the front end, so that the terms front and rear or equivalent expressions apply to the machine transversely as well as longitudinally, according to the position from which the parts and members being described are viewed.

Figures 2, 3, 4, 5, 6:
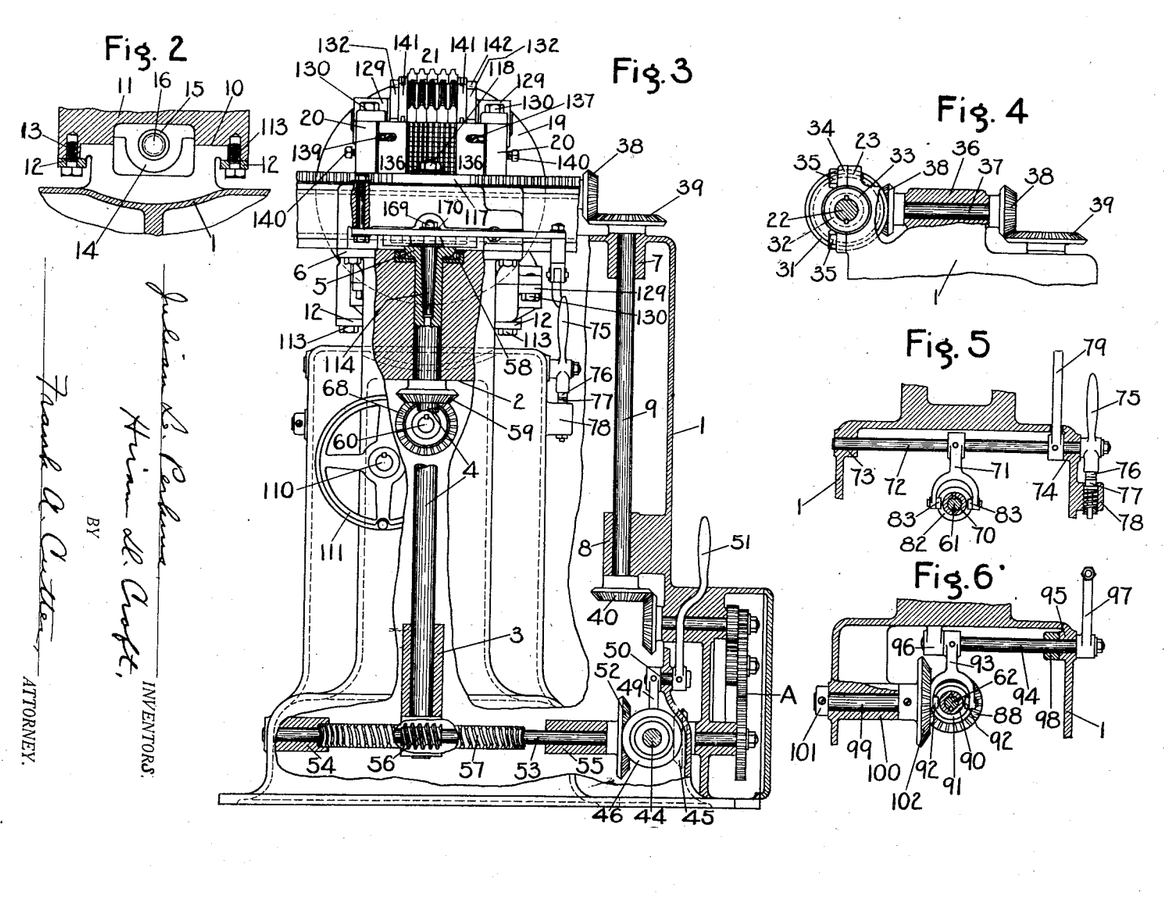
Fig. 2, a detail, in cross section, through portions of the bed and carriage of the machine, showing the manner in which the latter is supported and slides on the former.
Fig. 3, a front end elevation, with parts broken away, of said machine.
Fig. 4, a detail of the driving members between the horizontal, main or driving shaft of the machine and the vertical shaft at the rear end of the machine.
Fig. 5, a detail of the stopping and starting mechanism for the carriage.
Fig. 6, a detail of the forward and reverse clutch mechanism for said carriage.
Figure 7:
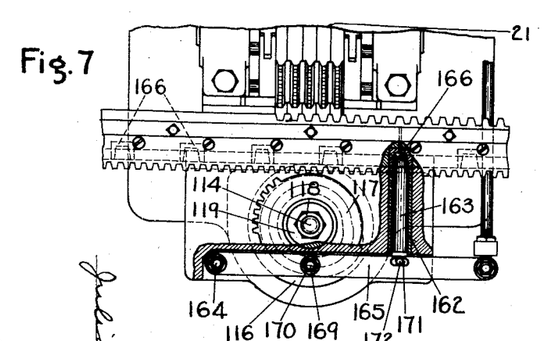
Fig. 7, an enlarged detail, in top plan and partial section, of the rack carrying and actuating mechanism.

The shaft 9 has secured thereto above the bearing 7 a bevel-gear 39 which intermeshes with the forward bevel-gear 38. Thus the shaft 9 is constantly driven from the shaft 22 through the medium of the bevel-gears 31, 38 and 39. Secured to the shaft 9 below the bearing 8 is a bevel-gear 40.
Journaled in bearings 41, 42, and 43, in the lower portion of the frame 1, is a shaft 44 which extends longitudinally of the machine. The shaft 44 is driven from the shaft 9 by means of change-speed gears, represented at A, one of which intermeshes with the bevel-gear 40 and another with the bevel-gear, indicated at 45, on the rear terminal of said shaft 44. Loosely mounted on the shaft 44, between the bearings 41 and 42, are two bevel-gears 46 each provided with a clutch member 47. Keyed to the shaft 44 and arranged to slide thereon between the clutch members 47 is the clutch member 48. A yoke 49 has its lower, forked terminal in engagement with the clutch member 48, and is secured at the upper end to the inner end of a horizontal spindle 50 that is journaled in the frame 1, as best shown in Fig. 3. An operating lever 51 is secured at the lower end to the outer terminal of the spindle 50. The construction of this clutch is very similar to that more fully illustrated in Fig 6, and which will subsequently be described in greater detail.

The clutch, which includes the members 47 and 48, is represented in disconnected or neutral position, but, by actuating the clutch member 48 into engagement with either of the clutch members 47, the bevel-gear 46 with which is connected the member 47 now engaged by the member 48 is set in motion, through the medium of the shaft 44 and the engaged clutch members. And upon actuating the clutch member 48 into engagement with the other clutch member 47 the connected bevel-gear 46 is caused to revolve. Thus provision is made for imparting motion in either direction to a bevel-gear 52 with which the bevel-gears 46 intermesh, said first-named bevel-gear being driven by either of said second-named bevel-gears, while the other of said bevel-gears 46 runs idly on the shaft 44. The clutch member 48 is actuated in either direction, within the limits of its travel by means of the yoke 49 and through the medium of the lever 51 and the spindle 50.

The bevel-gear 52 is secured to the inner terminal of the transverse shaft 53 that is journaled in bearings 54 and 55 in the bottom portion of the frame 1 at the front end thereof. A worm 56 is secured to the shaft 53 between the bearings 54 and 55. The worm 56 intermeshes with and drives a worm-wheel 57 secured to the lower terminal of the shaft 4.

The shaft 4 has an enlargement 5 at the upper end, which enlargement is supported by and runs on a ball-bearing represented at 58, the latter being set into the top of the table 6. The worm-wheel 57 is below the bearing 3. A bevel-gear 59 is secured to the shaft 4 directly under the bearing 2.

Shafts 60, 61, and 62, which are in line with each other and parallel with the shaft 44 below, are journaled in bearings 63, 64, 65, 66, and 67 in the frame 1 below the horizontal plane of the bed 10. Secured to the forward terminal of the shaft 60, in front of the bearing 63, is a bevel-gear 68 that intermeshes with the bevel-gear 59. The shaft 60 is, therefore, driven from the shaft 4 through the medium of the bevel-gears 59 and 68. Secured to the rear terminal of the shaft 60 behind the bearing 64 is a clutch member 69. Keyed to the forward terminal of the shaft 61 to cooperate with the clutch member 69 is a clutch member 70. Having its forked engagement with the clutch-membere 70 is a yoke 71 that is secured at the upper terminal to a transverse shaft 72 journaled in bearings 73 and 74 in the front and rear sides, respectively, of the frame 1, as shown in Fig. 5. The shaft 72 projects beyond the front side of the frame, and secured to such protruding terminal is an operating lever 75. The lever 75 is provided at the lower end with a wedge-shaped part 76 that contacts or engages with a similar part at the top of a vertical, spring-pressed plunger 77. The plunger 77 is located in a hollow projection 78 on the front of the frame, and serves as a latch for the lever 75. This latch feature is of usual and well-known construction. A lever 79 is secured at its lower terminal to the shaft 72 inside of the frame 1, and extends upwardly through a slot in the top of said frame into the path of a screw carried by the carriage 11, which screw serves as an adjustable dog and is designated by the numeral 80. The dog 80 is tapped horizontally into and through a lug 81 on the front side of the base of the carriage 11, behind the upper terminal of the lever 79, and provided with the usual knurled head and check-nut. The dog 80, with the lever 79, affords an automatic stop to limit the amount of forward movement of the carriage 11, but is not generally used in connection with the rack-broaching attachment.

The clutch member 70 is shown in operative engagement with the clutch member 69, and being thus held by the plunger 77, through the medium of the lever 75, the shaft 72, and the yoke 71. Upon actuating the lever 75 to force the part 76 to the right, past the apex of the plunger 77, the shaft 72 is partially rotated in the direction to withdraw the clutch member 70 from engagement with the clutch member 69, such withdrawal being effected by means of the yoke 71, and through the medium of the shaft 72. When the clutch is thus disengaged the shaft 61 ceases to revolve.

The clutch member 70 has an annular groove 82 therein into which projects engaging members 83—83 on the inside of the arms of the yoke 71, all in the customary manner and as shown in detail in Fig. 5. Secured to the shaft 62 in front of the bearing 66 is a gear 84, with a collar 85 in front of said gear. Secured to the shaft 61 behind the bearing 65 is a bevel-gear 86 having connected therewith a clutch member 87. A similar bevel-gear 88, having connected therewith a similar clutch member 89, is secured to the shaft 62 in front of the collar 85. The adjacent ends of the shafts 61 and 62 meet in the clutch member 87. Keyed to the shaft 62, between the clutch members 87 and 89, is a clutch member 90 in which is an annular groove 91 to receive projections 92—92 on the inner sides of the arms of a yoke 93, as best shown in Fig. 6. The clutch member 90 is adapted to be actuated by means of the yoke 93 into and out of engagement with either clutch member 87 or 89. The clutch member 90 is shown in Fig. 1 in engagement with the clutch member 87. The upper terminal of the yoke 93 is secured to a transverse shaft 94 that is journaled in a bearing 95 in the front of the frame 1, and a depending bearing 96 behind. The shaft 94 projects beyond the front side of the frame, and secured at the lower terminal to such protruding terminal of said shaft is an operating lever 97. The lever 97 on the outside of the bearing 95 and a collar 98 secured to the shaft 94 on the inside of said bearing hold said shaft against endwise movement. A transverse shaft or spindle 99 is journaled in a bearing 100 in the frame, and has secured to the outer end thereof a collar 101 and to the inner end thereof a bevel-gear 102, said collar and gear holding said spindle against endwise movement. The bevel-gear 102 is carried in position to intermesh with the bevel-gears 85 and 86.

It is now clear, assuming that the clutch member 70 is in engagement with the clutch member 69, so that the shaft 61 is being revolved from the shaft 60, that the bevel-gear 86 is rotating the bevel-gear 102, and the latter is revolving the bevel-gear 88 idly, and that the shaft 62 must be revolved in the same direction with the shaft 61, when the clutch member 90 is in engagement with the clutch member 87, since the former is keyed to the shaft 62; and that said shaft 62 must be revolved in the opposite direction, upon actuating said clutch member 90 out of engagement with said clutch member 87 and into engagement with the clutch member 89, because then said bevel-gear 102 drives said member 90. In the first case the driving connection is directly through the clutch members 87 and 90, and in the second case the driving connection is through the bevel-gears 86, 102, and 88, and the clutch members 89 and 90. The clutch member 90 is actuated in either direction, so as to engage it with either the clutch member 87 or the clutch member 89, through the medium of the lever 97, shaft 94, and yoke 93. Thus provision is made for reversing the movement of the shaft 62, and with it the movement of the carriage 11, which latter will appear more clearly from the explanation that is to follow.

Secured to the rear terminal of the shaft 62 behind the bearing 67 is a gear 103, and secured to the rear terminal portion of the shank 17 behind the bearing 18 are a gear 104 and a pinion 105. The gears 103, 104, and 105 are elements of a change-speed mechanism, represented at B in Fig. 1, between the shaft 62 and the shank 17, and through the medium of which said shank, and with it the screw 16, is rotated from said shaft. The shank 17 is held against longitudinal movement in the bearing 18 by the gear 104 behind and a collar 106 on said shank in front of said bearing. A projection 107, which is at the extreme rear end of the shank 17 and protrudes from that end of the casing 1, is angular in cross section and provided to receive a wrench or other implement for the purpose of operating said shank and the screw 9 directly by hand, should occasion require.

The two sets of change-speed gears, designated by the letters A and B, are such as are commonly employed in machines wherein it is desired to change the relative rates of rotation, and need no further description.

Journaled in the front and rear ends of the frame 1 at 108 and 109, respectively, below the shafts 60, 61, and 62, is a shaft 110, which latter is provided at the front end outside of said frame with a hand-wheel 111, and has secured thereto near the rear terminal thereof a gear 112 that intermeshes with the gear 84. The hand-wheel 111 on the outside and a collar 13 secured to the shaft 110 on the inside of the front bearing 108 holds said shaft against longitudinal movement.

When power is disconnected from the shaft 62, the shank 17 and screw 16 can be rotated indirectly by hand in either direction by grasping the hand-wheel 111 and revolving the same with the shaft 110 in one direction or the other, the movement from said last-named shaft to said shank being transmitted through the gears 112 and 84, said shaft 62, and the changes-speed gears B.

Figures 8, 9, 10, 12:
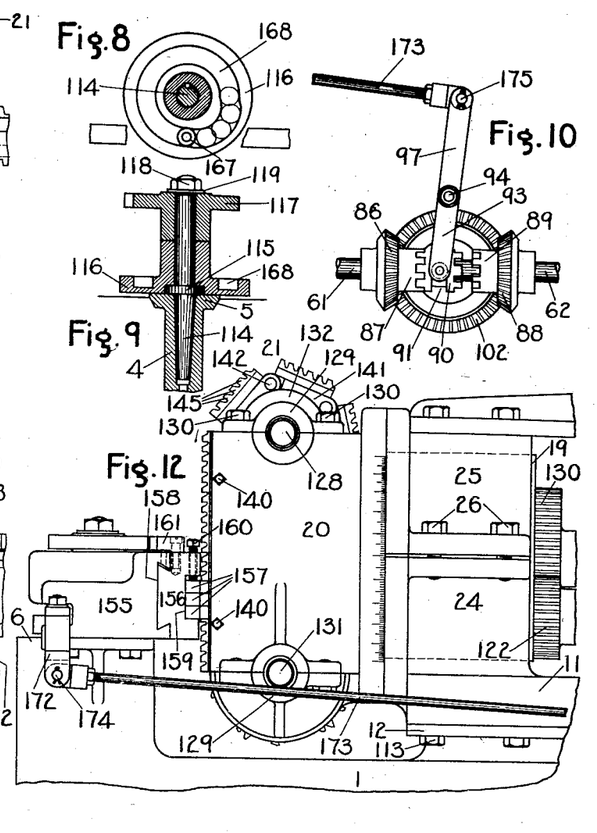
Fig. 8, an enlarged, top plan of the cam which forms a part of said mechanism.
Fig. 9, an enlarged, vertical section through said cam and members closely associated therewith.
Fig. 10, an enlarged, side elevation of said clutch mechanism.
Fig. 12, an enlarged, side elevation of the front end, upper portion of the machine.
Figure 11:
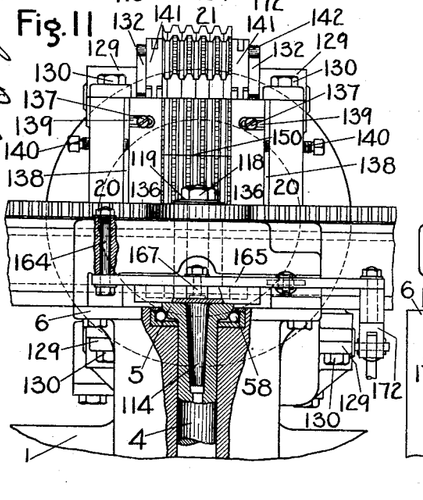
Fig. 11, an enlarged, front elevation, in partial section, of said rack carrying and actuating mechanism and the cutting element or chain broach and carrying or supporting members therefor.

The shaft 4 is provided at the upper terminal with an arbor 114, which arbor has a flange 115 to bear on the top of said shaft, as clearly shown in Fig. 9. Mounted on and secured to the arbor 114 above the shaft 4 is a cam 116, and mounted on and secured to said arbor above said cam is a segmental-gear 117. The cam 116 and the segmental-gear 117 are held in place on the arbor 114 above the flange 115 by means of a nut 118 screwed onto the upper terminal of said arbor, and a washer 119 interposed between said gear and said nut. The cam 116 and the segmental-gear 117 with their arbor 114 are parts of the attachment.

We will now describe the head 19 with its appurtenances, as best illustrated in Figs. 13, 17, 18, and 19. The head 19 is a cylindrical member arranged for rotary adjustment in the front end of the carriage 11, with a flange outside of such end. Said head is secured in place after adjustment by means of the bearing-cap 25 and the bolts 26, to which end the bearing-box 24 and said cap are so proportioned as to leave the clearances between adjacent portions of said box and cap, of which mention has previously been made. The bearing 24 and the cap 25 both have flanges at their front ends against which is received the flange of the head 19. A scale 120, Fig. 1, is provided on the periphery of the flange of the head 19 to cooperate with an indicator point or mark suitably located on the adjacent bearing or cap flange, or for which point or mark may be used the upper surface of the bearing 24 which is adjacent to said scale. By means of the scale 120 and the associated indicator mark the amount of rotary adjustment given the head 19 may be conveniently determined.

A shaft 121 is journaled in the head 19 parallel with the shaft 22. The shaft 121 is on a lower plane than the shaft 22, and nearer the front side of the carriage 11. Secured to the inner terminal of the shaft 121, which terminal protrudes from the head 19 behind the same, is a gear 122 that intermeshes with the gear 30 on the shaft 22. A thrust-bearing 123 is provided in the head 19 for the shaft 121. This thrust-bearing and the gear 122 prevent the shaft 121 from moving longitudinally, and the former receives the thrust from a worm 124. The thrust-bearing 123 is adjacent to the front end of the head 19, and the shaft 121 projects forwardly beyond said bearing. The worm 124 is secured to the forwardly-projecting portion of the shaft 121 intermediate of the terminals of such portion. When the head 19 is adjusted in its bearings in the carriage 11 and upon the shaft 22, said head carries with it the shaft 121 and all other connected parts and members, the gear 122 then riding around on the gear 30 to whatever extent is required during the adjustment of the head, and without at any time becoming disengaged from said last-named gear. The shaft 22 drives the shaft 121 through the medium of the gears 30 and 122, and such transmission is not interfered with by any possible adjustment that can be given the head 19 on said shaft 22. The gear 122 is held in place on the shaft 121 by means of a nut 125 and a washer 126.

The arms 20, at the front end of the head 19, are spaced apart and afford supports for the members which carry and directly actuate the chain broach 21. One of the arms 20 also affords a bearing for the foremost terminal of the shaft 121, which bearing has a bushing 127 therein, as will be seen upon referring to Fig. 19. At the top of the arms 20 are bushed bearings for a shaft 128, each of such bearings being completed by means of a cap 129 secured in place by bolts 130; and at the bottom of said arms are bushed bearings for a shaft 131, such last-named bearings being completed by means of additional caps 129 and bolts 130. The shafts 128 and 131 are transverse shafts arranged with their axes in the same vertical plane. Mounted on the shaft 128 is a pair of idlers 132, and mounted on the shaft 131 is a pair of notched driving wheels 133. The wheels 133 and a worm-wheel 134 are secured to the shaft 131, said worm-wheel being in position to intermesh with the worm 124. Said driving wheels are, therefore, driven from the shaft 121, through the medium of the worm 124, the worm-wheel 134, and the shaft 131. The notches in the wheels 133 are clearly shown at 135 in Fig. 17. The wheels 132 and 133 in each pair are spaced apart to enable the chain broach 21, with the exception of certain projecting wheel-engaging members thereof, to pass between said wheels.

On the front of the arms 20 are two chain-broach guides 136. These define the course of the chain broach 21 in its passage through the cutting field. Each guide 136 is fastened, by means of a plurality of screws 137, to an inwardly-projecting, inset part 138, at the front end of one of the arms 20. Lateral slots 139 are formed in each guide 136, extending inwardly from the outer edge thereof, to accommodate the screws 137 and permit said guide to be adjusted toward and away from its companion on said screws when the latter are loosened. Two bolts 140 are tapped into and through each arm 20, from the outside face or vertical edge thereof, to engage the outer edge of the adjacent guides 136, and assist in holding said guides against outward displacement after adjustment has been effected and the screws 137 tightened.

Figures 13, 14, 15, 16, 17, 18, 19:
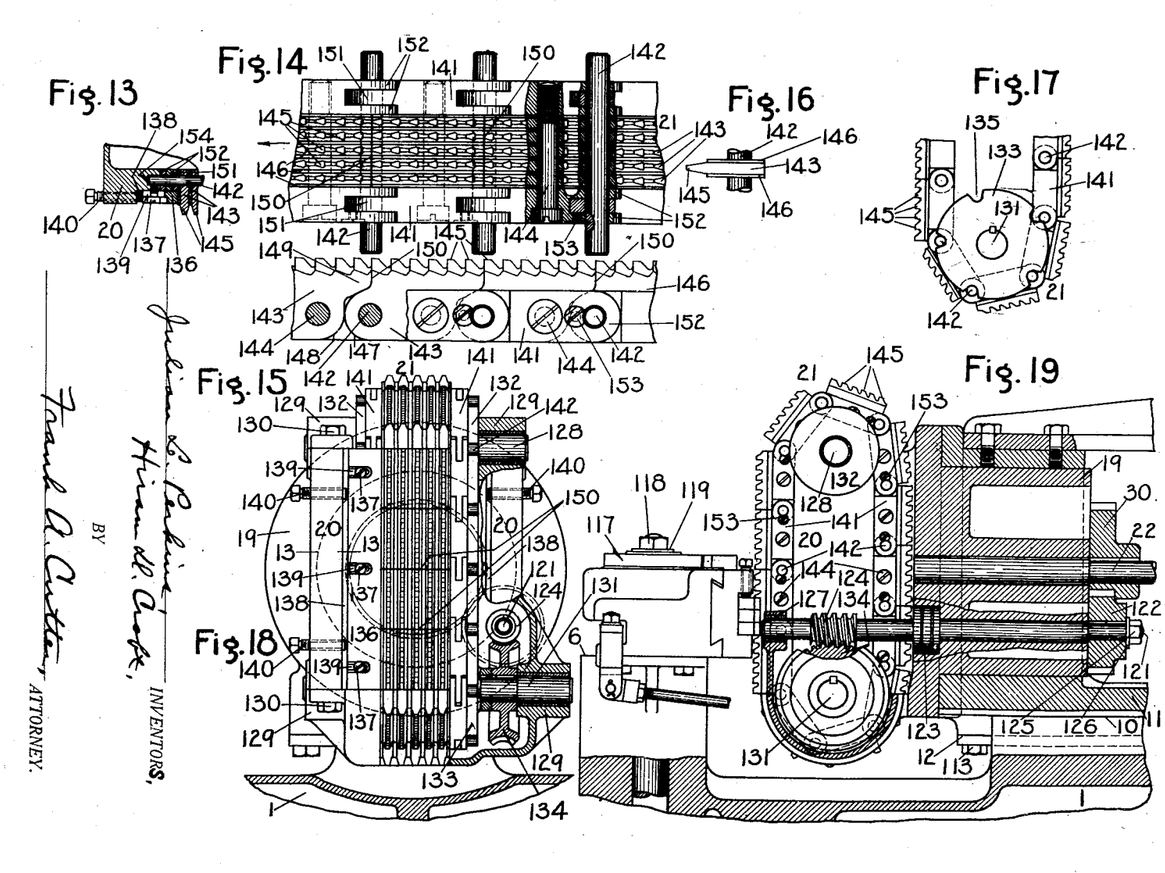

The cutting element or chain-broach 21, which is used in this machine, is described as follows, having special reference to Figs. 14, 15 and 16. This broach comprises a plurality of articulated units, each of such units comprising a pair of links 141, a pin 142 for said links at each end, one or more cutter-bars 143, and a screw 144. In the present example there are five cutter-bars 143 in each unit, and each of said cutter-bars is provided with six teeth 145, but the number of teeth will vary in different broaches. The row of teeth 145 on each cutter-bar 143 is arranged in parallel relation with the sides of said bar, and such row is in line with the rows on the preceding and following cutter-bars, so that there are five complete rows of teeth around the broach, all of which are in parallel relation with each other and with the sides of the cutter-bars and links 141. In other words, the teeth on this chain-broach are not arranged to form a lead or leads, as they are in the machine to which reference has been made. Thus strips 146 may be introduced between the cutter-bars 143, and between said bars and the inner sides of the links 141, to provide the broach with the necessary lands. The cutter-bars 143 with their teeth 145 project outwardly beyond the links 141 and the land strips 146.

At the leading end of each cutter-bar 143 is a curved projection 147, and a generally similar part 148 is formed at the opposite end of said bar, at which latter end there is also a part 149 that extends rearwardly, in the direction of travel, from the inner end of said part 148. When the cutter-bars 143 in contiguous units are traveling in a straight line, the leading end of any following bar, or that portion of such end which is outside of the projection 147 on said bar, and the rear end of the projection 149 on the immediately leading bar, above or beyond said first-named projection, are in contact with each other, and form a joint represented at 150; and when said two bars are out of said straight line, as when they pass over or under the wheels 132 or 133, respectively, said joint opens and the part 148 and the projection 147 roll on each other. The joint 150 in each case continues in a straight line between the cutter-bars 143 in two contiguous units, which line is at right-angles to the sides of said bars. The ends of the land strips 146 may be formed in a similar manner to the ends of the cutter-bars 143, or otherwise, as may be desired.

At the leading end of each link 141 is a lug 151, and at the opposite end of such link are two lugs 152 between which latter said lug 151 on the next following link is received. Each pin 142 passes through the lugs 151 and 152 of two of the links 141 on each side of a unit, and through the leading ends of the five cutter-bars 143 and of the strips 146 between said links in said unit. Said pin projects on both ends beyond the two links connected thereby, and is held against endwise movement by means of a screw 153.

Each screw 144 passes through the rear terminal portion of one of the links 141, and through the adjacent lands 146 and cutter-bars 143, to be tapped into the link 141 on the opposite side. Thus the screws 144 when seated draw the links 141 on opposite sides tightly against the intervening cutter-bars 143 and strips 146, and secure said bars and strips to said links in such a manner that there is no independent movement between the parts and members which enter into the construction of each chain-broach unit. These units, however, are pivotally connected by the pins 142 and have relative movement on said pins inwardly out of the perpendicular, but can not move outwardly out of the perpendicular because of the parts which form the joints 150.

The projecting terminals of the pins 142 are adapted to be received in the notches 135 in the wheels 133, which notches are properly spaced for that purpose, and to travel over the peripheries of the wheels 132. As the worm-wheel 134, which is actuated by the worm 124, revolves, it rotates the shaft 131 and the driving wheels 133, and the latter impart motion to the chain-broach 21. As shown at 154 in Fig. 13, a vertical channel is made in each arm 20 to receive the adjacent protruding terminals of the downwardly-moving pins 132 in the front reach of the broach 21, and assist in holding said reach to a straight course. The channel 154 is behind the inset part 138 of the arm 20.

The chain-broach 21 moves upwardly behind the wheels 132 and 133, and downwardly in front of said wheels.

Passing now to the attachment, and having reference more particularly to Figs. 7 to 12, inclusive, it will be seen that the same includes a horizontal supporting block 155, which is mounted on and securely attached to the table 6, and a horizontal, sliding carrier or holder 156 for the work. The latter is here represented by three rack blanks 157, all of which are in the act of being cut and formed into racks. It may be stated at this point that one or any number of blanks within the capacity of the machine can be broached at a time. The block 155 extends traversely of the machine, and the work holder 156 has a dove-tail projection on the forward side thereof to fit into and slide in a corresponding slot in the back side of said block, such slot being designated by the numeral 158. The slot 158 extends lengthwise of the block 155. The construction, arrangement, and position of the block 155 and the holder 156 are such that the latter is capable of being actuated horizontally in either direction, and, therefore, at right-angles to the vertical path or plane of the forward reach of the chain broach 21 when said broach is so positioned that its path is vertical. In the back side of the holder 156 is a longitudinal slot 159 in which the work is received. The blanks 157 are set into the slot 159 and securely held therein, by means of a plurality of bolts 160 which are tapped into and through that portion of the holder 156 that extends over the slot 159. The blanks 157 must, of course, project a sufficient distance behind the slot 159 to enable the broach 21 to cut the full depth of teeth in said blanks without coming into contact with the holder 156.

The rack 161 is secured to the top of the holder 156. The rack 161 extends lengthwise of the holder 156, and projects over the adjacent portion of the block 155, and said rack is arranged with its teeth on the front edge thereof and in the path of the teeth of the segmental-gear 117.

The block 155 supports the upper terminal portion of the arbor 114 by affording bearings for the hubs of the cam 116 and the segmental-gear 117. Said block also is provided with a horizontal, bushed bearing 162 for a draw pin 163, and has set therein a vertical bolt 164 which serves as a pivot for an operating lever 165. The bolt or pivot 164 is located adjacent to the left-hand or rear end of the block 155, and the bearing 162 is located adjacent to the right-hand or front end of said block. The pin 163 does not rotate in the bearing 162, but is reciprocated therein, and the inner terminal portion of said pin is receivable in any one of a plurality of bushed openings 166 in the holder 156. The openings 166 are equidistant apart in the outer side of the holder 156, and arranged with their axes in a horizontal plane common to said axes and to the axis of the pin 163. Said pin serves as a lock for the holder 156, whereby the same may be securely held against endwise movement whenever the pin is thrust into one of the openings 166. The rack 161 is intermittently actuated by the segmental-gear 117, which latter is provided with the number of teeth required to actuate said rack a distance equal to the distance between the centers of two adjacent openings 166. In the present construction the rack 161 and with it the holder 156 is intermittently actuated at each revolution of the segmental-gear 117.

The lever 165 is above the cam 116 and said lever is provided on the under side with a roller 167 which is received in the groove 168 of the cam 116. The roller 167 is attached to the lever 165 by means of a bolt 169 and a nut 170 in the customary manner. Between the bolt 169 and the free end of the lever 165 is a longitudinal slot 171 in said lever, and the outer terminal of the lock pin 165 is pivotally connected at 172 with said lever through said slot, said pin having a bifurcated head to receive the lever. Depending from the free end of the lever 165 is a swivel 172, and connecting said swivel with the clutch-operating lever 97 is a connecting-rod 173. The forward terminal of the connecting-rod 173 is pivotally connected at 175 with the upper terminal of the lever 97.

The groove 168 in the cam 116 has a part that causes the roll 167 to be thrust outwardly or carried forwardly at each revolution of said cam. When the roll 167 is thus carried forwardly by the cam 116, the lever 165, swinging on the pivot 164, is carried by said roll in the same direction, and said lever carries with it the lock pin 163 and the connecting-rod 173. This action or movement on the part of the lever 165 first causes the pin 162 to be withdrawn from the opening 166 wherein the inner terminal of said pin was entered, with the result that the holder 156 is released; and next causes the clutch member 90 to be disengaged from the clutch member 87 and engaged with the clutch member 89, thereby reversing the carriage. Finally the segmental-gear 117 engages the rack 161 and actuates said rack and the holder 156 with the blanks 157 to the right far enough to locate the opening 166 that is next adjacent, in the direction of travel of the rack, to the opening 166 last engaged by the pin 163. The connecting-rod 173 acts through the medium of the parts which intervene between it and the clutch member 90 to actuate the latter out of engagement with the clutch member 87 and into engagement with the clutch member 89, whereby the movement of the carriage 11 is reversed through the medium of the screw 16 and the intervening parts and members.

Subsequently the roller 167 is carried inwardly by the cam 116, by which time the required readjustment of the parts has taken place. The lever 165 is swung inwardly or rearwardly on the pivot 164, by the action of the cam 116 on the roller 167 whereby the latter is caused to approach the axis of said cam. The inwardly or rearwardly swinging lever 165 thrusts the lock pin 163 into the newly-presented opening 166, and so once more locks the holder 156 and secures the same with the blanks 157 against endwise movement. By the time the lever 165 has caused the pin 163 to relock the holder 156, said lever has thrust the connecting-rod 173 rearwardly and so brought about the disengagement of the clutch member 90 from the clutch member 89 and the engagement of said first-named clutch member with the clutch member 87, thus causing the carriage 11 to move again in the opposite direction or to advance toward the blanks 157.

The distance between the centers of any two adjacent openings 166 is equal to the width of the cutting portion of the chain broach 21. Consequently, the movement imparted to the rack 161 by the segmental-gear 117, which is equal to the distance between the aforesaid centers, is equal to the width of the cutting portion of the broach 21, so that, at each relocation of the rack 161 and parts directly and indirectly connected therewith, an uncut portion of the work is presented to the broach, which uncut portion when cut forms a continuation without any break or interruptions of the portion or portions of the work previously cut.

It is necessary to reverse and retract the carriage 11, at the end of the cutting operation for each section of the work cut by the chain broach 21, a sufficient distance to enable the teeth just cut on the work to clear the broach teeth, when the work is actuated to present a fresh portion thereof to the broach, and to cause said carriage to travel or move forward again. The operating mechanism for the holder 156 and for the carriage 11 are so timed that the required results are obtained, in the manner hereinbefore explained.

The complete operation of cutting the rack blanks 157 is described as follows:

While the carriage 11 is in its rearmost position, the blanks 157 are secured in place in the holder 156 and the head 19 is adjusted if necessary. The hand-wheel 111 is operated to advance the carriage 11 until the front reach of the chain broach 21 is quite close to the blanks 157. The power is applied through the belt 29 and the pulley 28 to the shaft 22, which sets in motion the broach 21, and the driving mechanism for the work shaft 4 and the screw 16, subject to the clutch controls. The lever 51 is thrown to reverse the shaft 4, which is permitted to revolve in reverse direction until the segmental gear 117 has actuated the rack 161 and the holder 156 far enough to the left to locate the first section of the work, that is to be cut by the broach 21, in position in front of said broach, when said lever is thrown over in the opposite direction to reverse said shaft again or cause the same to revolve in the opposite and what may be termed the normal direction. The lever 75 is thrown to couple the shaft 61 to the shaft 60. The screw 16 is now driven in the direction to cause the carriage 11 to move forward, and the broach 21 to come into contact with the stationary blanks 157, and to cut deeper and deeper into said blanks until the notches which form the first set of teeth are cut to the full depth. As soon as the full depth of the cut has been attained, the lock pin 165 is caused to release the rack 161, the clutch member 90 is actuated to reverse the screw 16 and with it the carriage 11, and the segmental-gear 117 actuates the rack 161 the required distance to the right, said rack carrying with it the holder 156 and the blanks 157. Then the rack 161 is relocked with the pin 163, and the position of the clutch member 90 changed to cause the screw 16 to rotate in the opposite direction, which is the direction required to advance the carriage 11. Said carriage is advanced again by the screw 16 and cuts another section of the work, after which said carriage is retracted, the rack 161 unlocked, relocated, and relocked, and said carriage caused once more to advance. These operations are repeated until teeth are formed on the blanks 157 throughout their entire length.

Ordinarily, when the rack-broaching attachment is employed, the stop 80, which is provided in connection with the lever 79 for automatically stopping the carriage 11 at the end of each cutting operation, is not required, and said stop is adjusted so that it is out of contact with said lever at all times during the operation of the machine. The office of the members 80 and 79 is performed by the cam 116 which causes the carriage 11 to be reversed as soon as the forward travel thereof has enabled the chain broach 21 to make its full-depth cut.

After the blanks 157 have been completed and converted into racks, the bolts 160 are loosened, and said racks are removed from the holder 156. Other blanks may now be placed in position and secured with the bolts 160, and cut in the same manner as before.

In the event it be desired to cut teeth in the work, which teeth are oblique, the head 19 is first adjusted on its axis in the carriage 11, until the plane of the path of the chain broach is inclined at the required angle.

What we claim as our invention, and desire to secure by Letters Patent, is—

1. In a rack-broaching machine, means to actuate the work intermittently, and a cutting element passing continuously through a straight path in operative position relative to the work.

2. In a rack-broaching machine, means to actuate the work intermittently, means to lock said work when stationary, and a cutting element passing through a circuitous path a portion of which is straight and in operative position relative to the work.

3. In a rack-broaching machine, means to actuate the work intermittently, a cutting element passing continuously through a straight path in operative position relative to the work, and means to advance said element toward said work and retract it therefrom.

4. In a rack-broaching machine, means to actuate the work intermittently, means to lock said work when stationary, a cutting element passing through a continuous path a portion of which is straight and in operative position relative to the work, and means to advance said element toward said work and retract it therefrom.

5. In a rack-broaching machine, means to actuate the work intermittently, a cutting element passing continuously through a straight path in operative position relative to the work, and means to separate said work and cutting element, to enable the work to be actuated.

6. In a rack-broaching machine, a cutting element passing continuously through a straight path, and means to carry the work and present consecutive portions thereof to the action of said element, said path being in operative position relative to the work.

7. In a rack-broaching machine, means to actuate the work intermittently, a cutting element passing through a circuitous path a portion of which is straight and in operative position relative to the work, means to separate said work and cutting element to enable the work to be actuated, and means to lock and release said work when stationary.

8. In a rack-broaching machine, means to actuate the work intermittently, and a cutting element made flexible to enable the same to pass through a circuitous path a portion of which is straight and in operative position relative to the work.

9. In a rack-broaching machine, means to actuate the work intermittently, and a cutting element jointed to enable it to pass through a circuitous path a portion of which is straight and in operative position relative to the work.

10. In a rack-broaching machine, means to actuate the work intermittently, a cutting element passing continuously through a straight path in operative position relative to the work, and means to advance and retract said element in the plane of said path.

11. In a rack-broaching machine, work-holding means, a cutting element passing continuously through a straight path a portion in operative position relative to said means, means to advance and retract said element in the plane of said path, and means to actuate said first-named means while said element is in its retracted position.

12. In a rack-broaching machine, work-holding means, a cutting element passing continuously through a straight path in operative position relative to said means, means to advance and retract said element in the plane of said path, and means to actuate said first-named means a distance equal to the width of the cutting members of said element, each time said element is retracted.

13. In a rack-broaching machine, work-holding means, and a cutting element passing continuously through a straight path in operative position relative to said means, said element having rows of teeth thereon which are parallel with the plane of said path.

14. In a rack-broaching machine, work-holding means, and a cutting element made flexible to enable it to pass through a circuitous path a portion of which is straight and in operative position relative to said means, said element having rows of teeth thereon which are parallel with the plane of said path.

15. In a rack-broaching machine, work-holding means, and a cutting element jointed to enable it to pass through a circuitous path a portion of which is straight and in operative position relative to said means, said element having rows of teeth thereon which are parallel with the plane of said path.

16. In a rack-broaching machine, work-holding means, a cutting element made flexible to enable it to pass through a circuitous path a portion of which is straight and in operative position to said means, said element having rows of teeth thereon which are in parallel relation to the plane of said path, and means to advance and retract said element in said path.

17. The combination, in a rack-broaching machine, with work-carrying means, of a cutting element made flexible to enable it to pass through a circuitous path, and having rows of teeth which are parallel with the sides of said element.

18. The combination, in a rack-broaching machine, with work-carrying means, of a cutting element jointed to enable it to pass through a circuitous path, and having rows of teeth which are parallel with the sides of said element.

19. The combination, in a rack-broaching machine, with work-carrying means, of a cutting element comprising units which are articulated together to enable said element to pass through a circuitous path and have rows of teeth parallel with the sides of said units.

20. In a rack-broaching machine, a cutting element having rows of teeth parallel with the sides of said element, supporting and driving means for said element, and means to reciprocate said last-named means.

21. In a rack-broaching machine, a cutting element having rows of teeth parallel with the sides thereof, supporting and driving means for said element, and means to adjust said element at different angles.

22. In a rack-broaching machine, a cutting element having rows of teeth parallel with the sides thereof, supporting and driving means for said element, means to adjust said element at different angles, and means to reciprocate said supporting and driving means.

23. In a rack-broaching machine, a cutting element having rows of teeth parallel with the sides thereof, means to support and drive said element with a portion of the same in a straight path, and a member adjustable about its axis and adapted to support and carry said means.

24. In a rack-broaching machine, a cutting element having rows of teeth parallel with the sides thereof, means to support and drive said element with a portion of the same in a straight path, a member adjustable about its axis and adapted to support and carry said means, and means to reciprocate said adjustable member.

25. In a rack-broaching machine, a cutting element passing continuously through a straight path, and having rows of teeth parallel with the sides of said element, means to support and drive said element, and means to guide said element through said path.

26. In a rack-broaching machine, a cutting element made flexible to enable it to pass continuously through a straight path, and having rows of teeth parallel with the sides of said element, means to support and drive said element, and means to guide said element through said path.

27. In a rack-broaching machine, a cutting element jointed to enable it to pass continuously through a straight path, and having rows of teeth parallel with the sides of said element, means to support and drive said element, and means to guide said element through said path.

28. In a rack-broaching machine, a cutting element having rows of teeth parallel with the sides of said element, means to support and drive said element in a path a portion of which is straight, and lateral guiding means for said element as it passes through the straight portion of said path.

29. In a rack-broaching machine, a cutting element having rows of teeth parallel with the sides thereof, means to support and drive said element in a path a portion of which is straight, and means to hold said element against movement toward or away from the plane common to the axes of said supporting and driving means as said element passes through the straight portion of said path.

30. In a rack-broaching machine, a cutting element passing continuously through a straight path, and having rows of teeth parallel with the sides of said element, means to support and drive said element in said path, and means to prevent said element from being deflected in any direction from said path as said element passes through the same.

31. In a rack-broaching machine, a cutting element made flexible to enable it to pass continuously through a straight path, and having rows of teeth parallel with the sides of said element, means to support and drive said element in said path, and means to prevent said element from being deflected in any direction from said path as said element passes through the same.

32. In a rack-broaching machine, a cutting element jointed to enable it to pass continuously through a straight path, and having rows of teeth parallel with the sides of said element, means to support and drive said element in said path, and means to prevent said element from being deflected in any direction from said path as said element passes through the same.

33. In a rack-broaching machine, a cutting element comprising articulated side links, intervening cutter-bars having teeth in parallel relation to said links, and means to attach said cutter-bars to said links.

34. In a rack-broaching machine, a cutting element comprising side links, intervening cutter-bars having teeth thereon which are in parallel relation to said bars, pins passing through contiguous terminals of said links and said bars at one end, and binding screws passing through said links on one side, through said bars, and into engagement with said links on the other side.

35. The combination, in a rack-broaching machine, with a carriage, an operating screw for the same, a cutting element carried by said carriage, a drive shaft, and means to actuate said cutting element from said shaft, of work-holding means, and automatic means intermittently to actuate said work-holding means and change the direction of said screws.

36. The combination, in a rack-broaching machine, with a carriage, an operating screw for the same, a cutting element carried by said carriage, a driving shaft, and means to actuate said cutting element from said shaft, of work-holding means, and means, operated from said shaft, intermittently to actuate said work-holding means and to change the direction of said screw.

37. The combination, in a rack-broaching machine, with a carriage, an operating screw for said carriage, a cutting element carried by said carriage, a drive shaft, and means to actuate said element from said shaft, of work-holding means, a work shaft, means to drive said work shaft from said drive shaft, means intermittently to actuate said work-holding means from said work shaft, means to actuate said screw from said work shaft, and means, operated by the actuating means for said work-holding means, to change the direction of said screw.

38. The combination, in a rack-broaching machine, with a cutting element driven in a path a portion of which is straight, of means to support the work in operative position relative to the straight portion of said path, and automatic means intermittingly to actuate said work-supporting means.

39. The combination, in a rack-broaching machine, with a cutting element, driving means for said element, and reciprocating means for said element, said last-named means consisting in part of a clutch mechanism, of a sliding holder for the work, and automatic means intermittently to operate said clutch mechanism, and actuate said holder.

40. The combination, in a rack-broaching machine, with a cutting element, driving means for said element, and reciprocating means for said element, said last-named means consisting in part of a clutch mechanism, of a sliding holder for the work, a lock for such holder, and automatic means intermittently to release said holder from said lock, operate said clutch mechanism, and actuate said holder.

41. The combination, in a rack-broaching machine, with a cutting element, driving means for said element, and reciprocating means for said element, said last-named means consisting in part of a clutch mechanism, of a sliding holder for the work, and automatic means sequentially to operate said clutch mechanism, actuate said holder, and again operate said clutch mechanism.

42. The combination, in a rack-broaching machine, with a cutting element, driving means for said element, and reciprocating means for said element, said last-named means consisting in part of a clutch mechanism, of a sliding holder for the work, locking means for said holder, and automatic means sequentially to unlock said holder, operate said clutch mechanism, actuate said holder, relock the same, and again operate said clutch mechanism.

43. The combination, in a rack-broaching machine, with a cutting element, means to drive said element, and means to reciprocate said element, said last-named means consisting in part of a clutch mechanism, of a sliding holder for the work, said holder being provided with a rack, a constantly-rotating member having secured thereto a segmental-gear in operative position relative to said rack, and a cam, a pivoted lever operatively connected with said cam, and connecting means between said lever and said clutch mechanism.

44. The combination, in a rack-broaching machine, with a cutting element, means to drive said element, and means to reciprocate said element, said last-named means consisting in part of a clutch mechanism, of a sliding holder for the work, said holder being provided with a rack, a constantly-rotating member having secured thereto a segmental-gear in operative position relative to said rack, and a cam, a pivoted lever operatively connected with said cam, connecting means between said lever and said clutch mechanism, and means connected with said lever to lock and release said holder.

45. The combination, in a rack-broaching machine, with a cutting element, means to drive said element, means to reciprocate said element, said last-named means consisting in part of a clutch mechanism, a work shaft, means to drive said shaft, and a cam and a segmental-gear driven by said work shaft, of a sliding holder for the work, said holder being provided with a rack in the path of said gear, a pivoted lever having a part in engagement with said cam, and connecting means between said lever and said clutch mechanism.

46. The combination, in a rack-broaching machine, with a cutting element, means to drive said element, means to reciprocate said element, said last-named means consisting in part of a clutch mechanism, a work shaft, means to drive said shaft, and a cam and a segmental-gear driven by said work shaft, of a sliding holder for the work, said holder being provided with a rack in the path of said gear, a pivoted lever having a part in engagement with said cam, connecting means between said lever and said clutch mechanism, and means connected with said lever to lock and release said holder.

47. The combination, in a rack-broaching machine, with a shaft, and a cam and a segmental-gear connected with said shaft, of a block, a work holder slidingly connected with said block, and provided with a rack in the path of said gear, said holder having recesses therein, a lever pivotally connected with said block, and having a part for engagement with said cam, and a lock-pin slidingly arranged in said block and connected with said lever, said pin being adapted to enter any of said recesses.

48. The combination, in a rack-broaching machine, with a cutting element, means to drive said element, and means to reciprocate said element, said last-named means consisting in part of a clutch mechanism, of a work shaft, a cam and a segemental-gear connected with said shaft, a block, a work holder slidingly connected with said block, and provided with a rack in the path of said gear, a lever pivotally connected with said block, and having a part in engagment with said cam, and connecting means between said lever and said clutch mechanism.

49. The combination, in a rack-broaching machine, with a cutting element, means to drive said element, means to reciprocate said element, said last-named means consisting in part of a clutch mechanism, of a work shaft, a cam and a segemental-gear connected with said shaft, a block, a work holder slidingly connected with said block, and provided with a rack in the path of said gear, said holder having recesses therein, a lever pivotally connected with said block, and having a part in engagement with said cam, connecting means between said lever and said clutch mechanism, and a lock pin arranged to slide in said block, and connected with said lever, said pin being adapted to enter any of said recesses.

50. The combination, in a rack-broaching machine, with a cutting element capable of passing continuously through the cutting field, and comprising a plurality of rows of teeth laterally, means to drive said element, and means to advance and retract said element, of a work holder, and means to actuate said holder a distance equal to the width of said rows of teeth, when said element is in retracted position.

51. The combination, in a rack-broaching machine, with a cutting element comprising a plurality of rows of teeth laterally, means to drive said element, and means to reciprocate said element, of a work holder, and automatic means to actuate said holder a distance equal to the width of said rows of teeth, when said element is in retracted position.

52. The combination, in a rack-broaching machine, with a cutting element comprising a plurality of rows of teeth laterally, means to drive said element, and means to reciprocate said element, of a work holder, means to actuate said work holder a distance equal to the width of said teeth, and means to lock said work holder at the end of such movement.

53. The combination, in a rack-broaching machine, with a cutting element comprising a plurality of rows of teeth laterally, means to drive said element, and means to reciprocate said element, of a work holder, automatic means to actuate said work holder a distance equal to the width of said teeth, and automatic means to lock said work holder at the end of such movement.

54. The combination, in a rack-broaching machine, with a cutting element, means to drive said element, and means to reciprocate the same, of a work holder, means to cause said element to be retracted at the end of its operation on a given portion of the work, means to actuate said work holder to present the next portion of the work to the action of said element, and means to cause said element to advance.

55. The combination, in a rack-broaching machine, with a cutting element, means to drive said element, and means to reciprocate the same, of a sliding work holder, locking means for said work holder, means to cause said element to be retracted at the end of its operation on a given portion of the work, and subsequently to be advanced, means to unlock and subsequently to relock said holder, and means to actuate said holder, while unlocked and said element is in retracted position, to present the next succeeding portion of the work to the action of said element.

JULIAN L. PERKINS.
HIRAM D. CROFT.

Witnesses:
F. A. CUTTER,
C. C. WEST.